United States Patent [19]

Grubb

[11] 3,725,311
[45] Apr. 3, 1973

[54] LOW TEMPERATURE EXTRUDABLE ODOR-NEUTRALIZING COMPOSITION

[75] Inventor: Larry M. Grubb, Dallas, Tex.
[73] Assignee: Thuron Industries, Inc., Dallas, Tex.
[22] Filed: May 15, 1972
[21] Appl. No.: 253,666

Related U.S. Application Data

[63] Continuation of Ser. No. 10,993, May 15, 1972, abandoned.

[52] U.S. Cl. .............. 252/522, 260/41 R, 260/41 A, 264/211, 424/76
[51] Int. Cl. .............................................. C11b 9/00
[58] Field of Search ......... 252/522; 260/41; 264/211; 424/76

[56] References Cited

UNITED STATES PATENTS

| | | | |
|---|---|---|---|
| 2,384,521 | 9/1945 | Andersen et al. | 264/211 |
| 3,303,046 | 2/1967 | Chebinak et al. | 252/522 |

FOREIGN PATENTS OR APPLICATIONS

| | | | |
|---|---|---|---|
| 542,734 | 1/1942 | Great Britain | 264/211 |

OTHER PUBLICATIONS

Sarvetnick, Harold A., Polyvinyl Chloride, Van Nostrand Reinhold Co., 1969, pages 107, 108 and 139. TP1180.V485C.2

Primary Examiner—Morris Liebman
Assistant Examiner—J. H. Derrington
Attorney—Donald W. Erickson

[57] ABSTRACT

An extrudable composition and the process of producing it comprising a polymer of 80 to 98 percent PVC, 2 to 20 percent PVAc, and 0 to 20 percent PVA, a plasticizer, a filler to maintain a dry mixture and a volatile odor-neutralizing or modifying agent, the composition being extrudable at a temperature of below 250° F in order to avoid loss of the volatile odor-neutralizing agent through degradation or evaporation.

4 Claims, No Drawings

LOW TEMPERATURE EXTRUDABLE ODOR-NEUTRALIZING COMPOSITION

This application is a continuation of copending application Ser. No. 10,993 filed May 15, 1972, now abandoned.

This invention relates generally to an odor-modifying composition to control the release of various volatile agents capable of producing desirable odor change in the atmosphere. More particularly, the present invention relates to a method and composition for producing an extruded product without heating the composition to a temperature which causes the loss of the volatile agents through degradation or evaporation.

The problem of unpleasant odors has plagued people and industry for years. Attempts to combat the problem has led to a variety of chemicals and devices for dispensing such chemicals. There are, for instance, masking agents, desensitizers, deodorizers, deodorants, antimicrobial agents which are examples of the various chemicals used in the art. As dispersing means there are aerosols, wick-type bottles, gels, and various other special mechanical equipment, each of which serves to pass the chemical from its reservoir to the atmosphere.

While the means of neutralizing mal-odors has been available for some period of time, there has also been something lacking in each of the methods of application or dispensing. The aerosol, which is the most widely accepted dispensing method, provides only temporary control. The wick-type bottles are often quite messy and require continual raising and lowering of the wick to maintain any effectiveness. Mechanical equipment for dispensing is quite often expensive, difficult to install, and requires periodic maintenance.

What is desired is an inexpensive approach to not only dispensing the volatile agent, but also to protect this agent from the ravages of moisture or the elements of the atmosphere, particularly those that would tend to oxidize the usually easily oxidizable volatile agent.

Insecticides and other volatile pesticides have been known for decades to be combinable with thermoplastic resins, particularly vinyl resins, which include polyvinyl halides, such as polyvinyl chloride, to provide for a controlled release of the insecticide. While the protection afforded the volatile pesticide in such cases is adequate and, importantly, a gradual release over a period of time is effected, such a resin would not be useful with the volatile odor-neutralizing agents such as the natural oils or essences to form an extruded product.

To produce an extruded product using polyvinyl chloride, for instance, temperatures in the extruder would be reached which not only would exceed 300° but often exceed 350° F. Such temperatures would destroy the natural oils or essences either by producing a rapid evaporation of these volatile substances or initiating degradation due to the exposure to the high heat. Such temperatures that would be attained in the conventional extrusion apparatus would, even if achieved for only a short period of time, produce a distinct loss in quality of the volatile material, and also substantially reduce the period of effectiveness during which the volatile agent would be expected to evaporate to the atmosphere.

It is therefore an object of the present invention to provide a novel extrudable composition capable of modifying or neutralizing unpleasant or undesirable odors through the controlled release of a volatile agent over an extended period of time.

It is also an object of the present invention to provide a process for the manufacture of an odor-modifying composition which is capable of being extruded at a low temperature such that there is little, if any, loss of the volatile agent due to evaporation or degradation.

This invention also has an object the provision of a resin composition which is capable of being mixed and extruded with a volatile odor-neutralizing agent at temperatures sufficiently low to avoid the undesirable loss of the volatile agent while providing adequate protection for the volatile agent in the form of the final product.

A more specific object of the present invention is to provide an extrudable composition and method for protecting natural oils and essences such as the perfumes and other fragrances which are effective as odor-neutralizing agents from the contact with moisture and other elements in the atmosphere that would tend to degrade these volatile agents.

These and other objects of the present invention will become apparent after a careful reading of the following specification and claims:

It has been discovered that a particular polymer composition including 80 to 98 percent polyvinyl chloride, 2 to 20 percent polyvinyl acetate, and from 0 to 20 percent polyvinyl alcohol will permit the incorporation of volatile aromatic natural essences or oils used as odor-neutralizing agents into the resin by a mixing at low temperature. A mixture of this polymer and such an agent will then permit the extrusion of the mixture at temperatures below 250° or even below 200° F down to as low as 150° F to form a solid homogeneous product. This polymer is in the form of a matrix which includes the odor-neutralizing agent and controls the release of the agent over a long period of time. The polymer and odor-neutralizing agent combination prevents the undesirable loss or degradation of the agent either in the mixing or the extrusion, as well as during the use of the combination in its extruded form.

The particular polymers that are useful are those which are copolymers of polyvinyl chloride which consist essentially of 80 to 98 percent polyvinyl chloride and 3 to 20 percent polyvinyl acetate. The incorporation of polyvinyl alcohol is preferred, although not essential, and may be present in an amount between 0 to 20 percent by weight of the resin composition. Such resins as are specified in accordance with the present invention may be obtained by first substituting a portion of the chloride groups of a polyvinyl chloride with acetate and then, optionally but preferably, hydrolyzing the acetate radicals if it is desired to produce the terpolymer. The final product terpolymer would therefore consist of a combination of polyvinvyl chloride, polyvinyl acetate, and polyvinyl alcohol. Preferred proportions of the polymers forming the terpolymer would be 80 to 95 percent polyvinyl chloride, 5 to 15 percent polyvinyl acetate, and 5 to 15 percent polyvinyl alcohol. The molecular weight of the dicomponent or tricomponent polymers should be between 1,000 and 25,000. The total amount of the resin in the composition may vary considerably depending upon the types of materials used with the resin but generally, though not necessarily, should vary between 30 to 70 percent of the total weight of the composition.

The volatile agents that are used as odor-neutralizing or modifying agents are those natural oils or essences having strong aromatic fragrances which are highly volatile having a vapor pressure between 0.1 mm to 10 mm at 24° C. Among the substances are commonly used perfumes and perfume bases and may include, though are not limited to, plant or vegetable essences such as citrus oils including lemon and orange, wood oils including pine, cedar, sassafras, and the like, flower oils such as rose and lilac. The type of natural oil or essence that would be used is not in any way limited except that it be compatible with the resin and have a vapor pressure within the limit mentioned above. It is desired, though not essential, that the volatile agents constitute 5 to 40 percent of the total composition.

The resin may be plasticized with any suitable plasticizer commonly used in compounding polyvinyl chloride. Among those which are suitable, although by no means limiting, are the following:

Phthalate esters di(2-ethyl hexyl) phthalate (DOP)
diisooctul phthalate (DIOP)
diisodecyl phthalate (DIDP)
ditridecyl phthalate (DTDP)
dicapryl phthalate (DCP)
dibutyl phthalate (DBP)

Adipates di(2-ethyl hexyl) adipate (DOA)
diisodecyl adipate (DIDA)
di(n-octyl n-decyl) adipate (DNODA)

Azelates dihexyl azelate (DHZ)
di(2-ethyl hexyl) azelate (DOZ)
diisooctyl azelate (DIOZ)
dihexyl azelate (DHZ)

Phosphate esters tricresyl phosphate (TCP)
cresyl diphenyl phosphate (CDP)
octyl diphenyl phosphate (ODP)
triphenyl phosphate (TPP)
and other similar type plasticizers The plasticizers may be used in suitable amounts well recognized in the art. Usually, it has been found desirable to include plasticizers in the amount of 5 to 40 percent by weight of the total composition.

In the compounding and mixing of the polymer with the odor-neutralizing agent, it is desirable to include a filler in order to maintain the composition dry prior to extrusion inasmuch as the volatile agents are usually liquid. Among such fillers which are compatible with, and will absorb liquid, volatile agents are the following:

Silica products diatomaceous earth
wet process or fumed silica
silica aerogel
mineral silicates
kaolinite
mica
talc
wollastonite
calcium carbonate
cellulosic fibers
and other type materials The filler may vary considerably in amount in the overall composition, but usually it is found that 5 to 30 percent by weight of the filler composition will provide adequate dryness to permit extrusion of a dry mixture.

Dyes or other suitable coloring matter may be added, if desired, though this is not essential. For purposes of extrusion, it is usually desirable to add a lubricant but its inclusion is not essential in the present invention. If lubricants are used, mineral oil is a typically useful lubricant for extrusion.

The preparation of the composition of the present invention, including the polymer and the volatile odor-neutralizing agent, includes the physical mixing such as by mechanical means of the copolymer which is usually in the form of a dry powdered resin into which may be added the volatile odor-neutralizing agent — usually liquid. The fillers may be added while mixing to maintain the resulting powder dry. The plasticizers may also be added, and the product mixed without attaining temperatures above 150° F in order to preserve and protect the volatile agent. Thereafter, the mixed dry powder is set to be extruded in a conventional extruder, and the temperature maintained at below 250° F, usually below 200° F, with temperature of about 150° to 175° being preferred.

Because of the use of the particular resin forming the copolymer, it is possible to mix and extrude the composition at far lower temperatures than heretofore thought possible.

The resulting product contains the volatile agent in a molecular mixture that may approach a solution in solid form. The volatile agent is not chemically altered and retains all of its characteristics while remaining within the matrix of the solid polymer.

The mechanics of the movement of the volatile agent through the matrix of the polymer to the surface where it may evaporate is not clear, nor is it precisely clear how the volatile agent is retained within the polymer matrix. An understanding of the mechanism of operation is desirable but not essential in order to reproduce the results that are set forth by this invention.

It is desirable that the release of the volatile agent be continuous over a period of several months in order to provide a useful life. In order to achieve this, the rate of release should be not more than 1 gram nor less than 0.01 gram of the volatile agent per day.

Examples of the present invention are as follows:

EXAMPLE I

| | |
|---|---|
| Union Carbide VAGH (copolymer of PVC, PVA, and PV Acetate) | 51.0% |
| Mineral Oil (Nujoy) | 0.3% |
| Diatomaceous earth | 19.0% |
| Perfume (mint) | 21.0% |
| Santicizer 213 (Phthalate plasticizer blend) | 8.7% |

Material is mixed at 125° F in a Henschel mixer and extruded at temperatures between 100° F and 150° F. The extrudate is cut into bars 2-¼ inches × 10 inches × ¼ inch and weighing 110 grams.

EXAMPLE II

| | |
|---|---|
| Firestone Resin 4301 (copolymer of PVC, and PV Acetate) | 46.95% |
| Diatomaceous earth | 17.80% |
| Perfume (lemon oil) | 27.00% |
| Mineral Oil (Nujoy) 0.10% | |
| Dyes and pigments | 3.15% |

| | |
|---|---|
| Santicizer 213 (phthalate plasticizer blend) | 5.00% |

Mixed, extruded, as in Example I, bars cut to 65 grams.

EXAMPLE III

| | |
|---|---|
| Firestone Resin 4301 (copolymer of PVC, and PV Acetate) | 46.45% |
| Diatomaceous earth | 19.00% |
| Perfume (floral) | 20.00% |
| Mineral Oil (Nujoy) | 0.30% |
| Santicizer 213 (phthalate plasticizer blend) | 13.00% |
| Dyes and pigments | 3.15% |

The products of the foregoing examples were tested and were found to continuously release the volatile perfume for a period greater than 30 days into the atmosphere where it overcame and neutralized any unpleasant odors that would arise in the environment of the composition. Bars of such composition may therefore be utilized by having a single bar of the approximate size of Example I, and placed in a home-size room or office will be found to give continuous odor neutralization for a period in excess of 30 days and up to 3 months.

What I claim is:

1. An odor-modifying composition consisting essentially of, by weight of the composition, a. 30 to 70 percent of solid polymer having a molecular weight between 1,000 and 25,000 selected from the group consisting of a terpolymer of 80 to 98 percent vinyl chloride, 2 to 20 percent vinyl acetate and up to 20 percent vinyl alcohol and a copolymer consisting of 80 to 98 percent vinyl chloride and 2 to 20 percent vinyl acetate;

b. 5 to 40 percent of a dialkyl phthalate or dialkyl adipate plasticizer;

c. 5 to 30 percent of a suitable filler; and d. 5 to 40 percent of a volatile odor-modifying agent selected from the group consisting of natural oils and essences, having a strong aromatic fragrance and a vapor pressure between 0.1 mm to 10 mm 24° C.

2. A composition according to claim 1 wherein the polymer is a terpolymer of vinyl acetate, vinyl chloride and vinyl alcohol, the plasticizer is dialkyl phthalate and the filler is diatomaceous earth.

3. A composition according to claim 2 wherein 51 polymer is present in the amount of about 51 percent, said plasticizer in the amount of about 8 percent, and said filler in the amount of about 19 percent.

4. A composition according to claim 3 which contains from about 0.1% to 0.3% mineral oil.

* * * * *

UNITED STATES PATENT OFFICE
CERTIFICATE OF CORRECTION

Patent No. 3,725,311          Dated April 3, 1973

Inventor(s) Larry M. Grubb

It is certified that error appears in the above-identified patent and that said Letters Patent are hereby corrected as shown below:

[63], "May 15, 1972" should read --Feb. 12, 1970--.

Claim 3, line 1, "51" should read --- said ---.

Signed and Sealed this

First Day of March 1977

[SEAL]

Attest:

RUTH C. MASON
*Attesting Officer*

C. MARSHALL DANN
*Commissioner of Patents and Trademarks*